United States Patent [19]

Flynn, Jr.

[11] Patent Number: 4,482,786
[45] Date of Patent: Nov. 13, 1984

[54] MEMORY DIALER SYSTEM FOR USE WITH PLURAL TELEPHONES AND HAVING PROVISION FOR STACKING MORE THAN ONE USER

[75] Inventor: Arthur Flynn, Jr., Syosset, N.Y.

[73] Assignee: Metro-Tel Corp., Syosset, N.Y.

[21] Appl. No.: 351,325

[22] Filed: Feb. 22, 1982

[51] Int. Cl.³ .......................................... H04M 1/274
[52] U.S. Cl. .......................... 179/90 B; 179/90 BD; 179/81 R; 179/18 BA
[58] Field of Search .......... 179/90 B, 90 BB, 90 BD, 179/99 LC, 99 LS, 99 R, 84 L, 81 C, 81 R, 18 BA

[56] References Cited

U.S. PATENT DOCUMENTS 4,277,651 7/1981 Fisher et al. .................. 179/90 BD
4,332,985 6/1982 Samuel ........................ 179/90 B X Primary Examiner—Stafford D. Schreyer
Attorney, Agent, or Firm—Stoll, Wilkie, Previto & Hoffman

[57] ABSTRACT

The invention is directed to a memory dialer system in which a central memory system is used for all extensions of a particular telephone network. The system can be used with up to four telephone lines and is provided with stacking means so that if two calls are made simultaneously, a single call is serviced and busy signals sent to the others until the telephone line is free.

30 Claims, 6 Drawing Figures

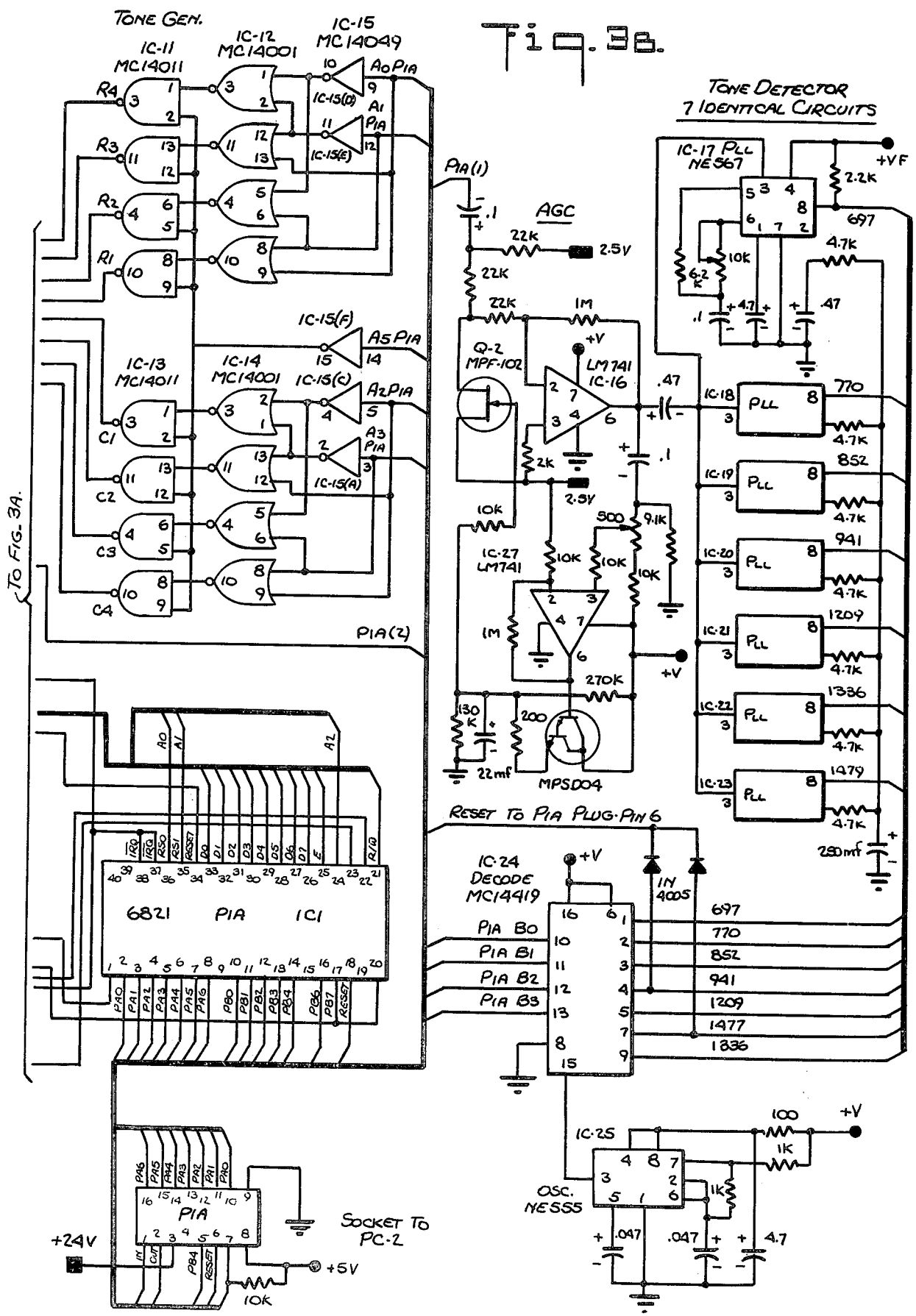

4,482,786

MEMORY DIALER SYSTEM FOR USE WITH PLURAL TELEPHONES AND HAVING PROVISION FOR STACKING MORE THAN ONE USER

DESCRIPTION OF THE INVENTION

The present invention relates to memory dialer systems and more particularly to an improved memory dialer system which will service all extensions from a single control unit.

Hereto fore memory dialer systems have been used in which it was necessary for a memory dialer unit to be installed at each extension. This earlier system is expensive and difficult to service.

The present invention avoids this drawback and provides for an improved memory dialer system which can service all extensions from a single control unit.

Another object of the present invention is the provision of an improved memory dialer system which can service up to four telephone lines.

Another object of the present invention is the provision of an improved memory dialer system whereby if more than two calls are dialed, one is held on hold until the line is clear.

Another object of the present invention is the provision of an improved memory dialer system in which the unit waits for dial tone before dialing.

Another object of the present invention is the provision of an improved memory dialer system in which the unit alerts the user by dialing even if the dial tone is excessive.

Another object of the present invention is the provision of an improved memory dialer system in which the unprogrammed access codes in unit return dial tone only.

Another object of the present invention is the provision of an improved memory dialer system in which the power failure without hook up battery results in complete erasure of memory so that incorrect numbers are not dialed.

Another object of the present invention is the provision of an improved memory dialer system in which the unit will stack users on multiple access.

Another object of the present invention is the provision of an improved memory dialer system in which the stacking occurs when two or more parties want service.

Another object of the present invention is the provision of an improved memory dialer system in which failure of commercial power supply does not inhibit ordinary use of the telephone.

Another object of the present invention is the provision of an improved memory dialer system in which when stacking occurs, user is notified by fast busy signal.

Another object of the present invention is the provision of an improved memory dialer system in which when unstacking, user is notified of his turn by silencing of busy tone so that he need only depress 2 digit access code without a second `*` depression being required.

Another object of the present invention is the provision of an improved memory dialer system in which going on hook removes user from stack.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIGS. 3A and 3B are a schematic view of a microprocessor used with the present invention.

The present invention comprises a memory dialer system (hereinafter MDS) which provides a means of storing 100, 16 digit telephone numbers which can be accessed at any standard tone dial phone extension. The MDS services up to 4 telephone lines or trunks on typical key systems and PBX's. Any tone dial phone in the MDS and on such key system can then access any of the 100 numbers. All phones with the MDS can program the individual memory positions and can access them for recalling numbers at a later time.

The MOS is a computer based system, using time sharing among the 4 telephone lines or trunks. This may result in stacking so that when two or more accesses are made by different phones on different lines at the same time, only one access is serviced at a time. Each party or access is serviced individually and sequentially. If stacking occurs, i.e. a plurality of simultaneous users, signals are sent to the stacked parties indicating a busy line until unstacking occurs.

The MDS dials out in rapid tones after the access code and 2 digits which denote memory position are dialed into the MDS. The MDS waits momentarily before dialing until dial tone is present to prevent false dialing.

The telephone used to access the MDS will have normal keypad functions before and after the MDS. Such provision allows rapid dialing to a computer and then manually dialing security digits.

The following discussion will not include details of micro-processor function, but will refer to program, instrument set, inputs and outputs. The micro-processor will be kept as a control element and discussed only in general.

Figure 1:
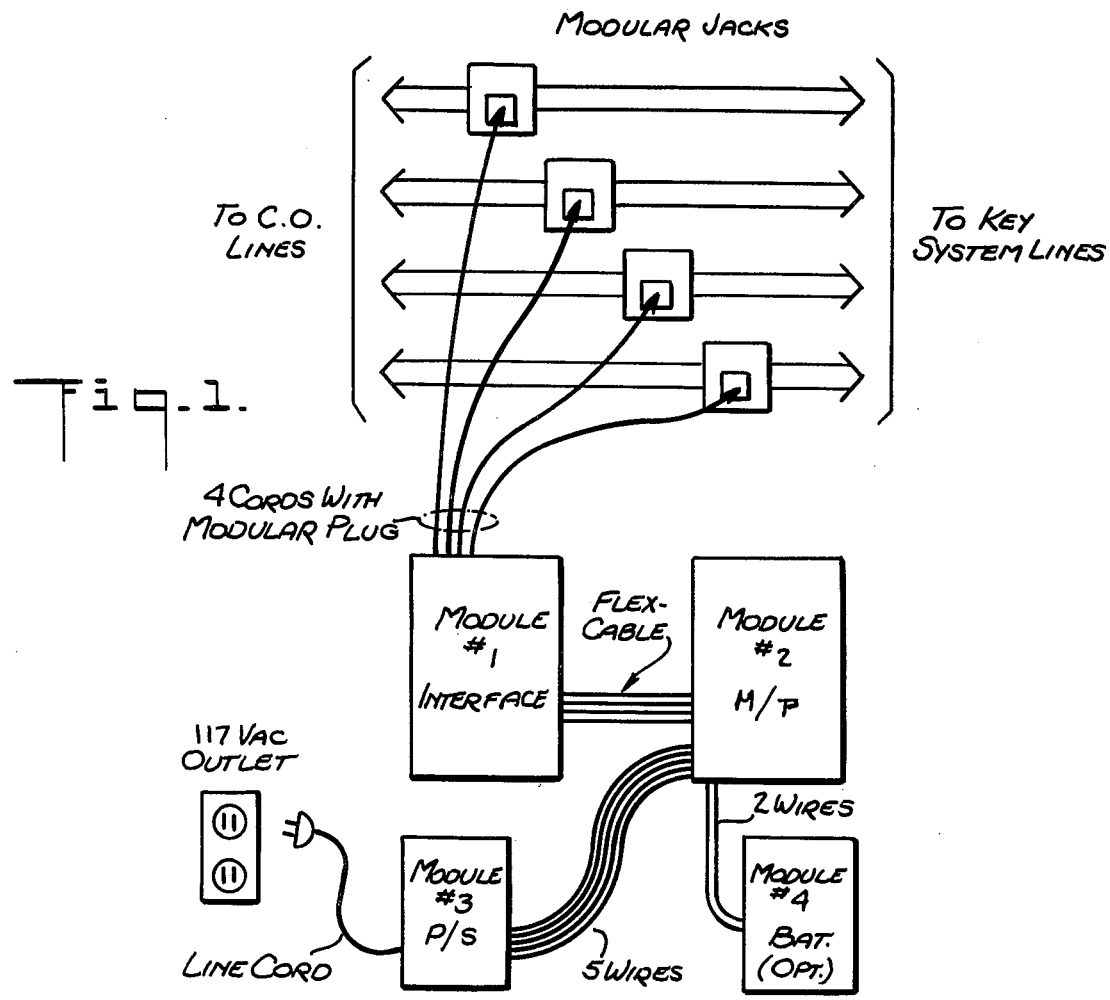
FIG. 1 is a schematic view showing the manner of connecting four telephone lines to the improved memory dialer system of the present invention.
Figure 2:
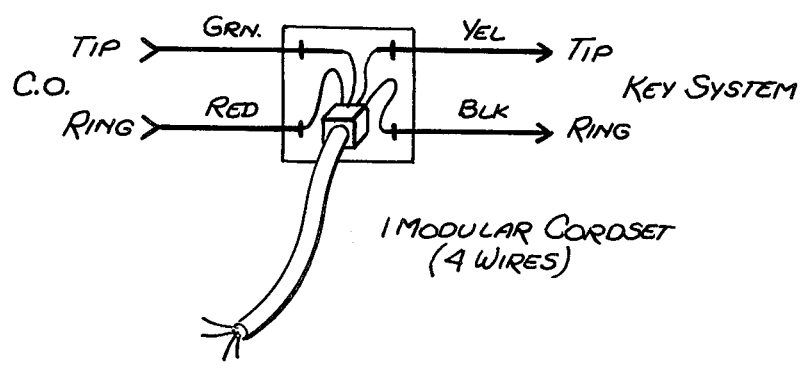
FIG. 2 is a detail of the modular jack used with the present invention.

As shown in FIGS. 1 and 2, the invention utilizes an interface unit or module and a micro-processing unit or module M/P. The M/P module is connected by the usual cables to a power supply unit or module P/S which, in turn, is connected to an electric outlet. The interface module is connected to four telephone lines by means of four cables extending therefrom. In the invention as described herein, each cable is connected to a telephone line by a unit or modular jack which is schematically shown in FIG. 2. However, it will be understood that, if desired, the invention may be used with the cables being hard wired to the telephone lines.

Also shown in FIG. 1 is a battery unit or module which may be optionally used and which may be electrically connected to the M/P module and which may be used in case of a power failure.

Figure 3A:
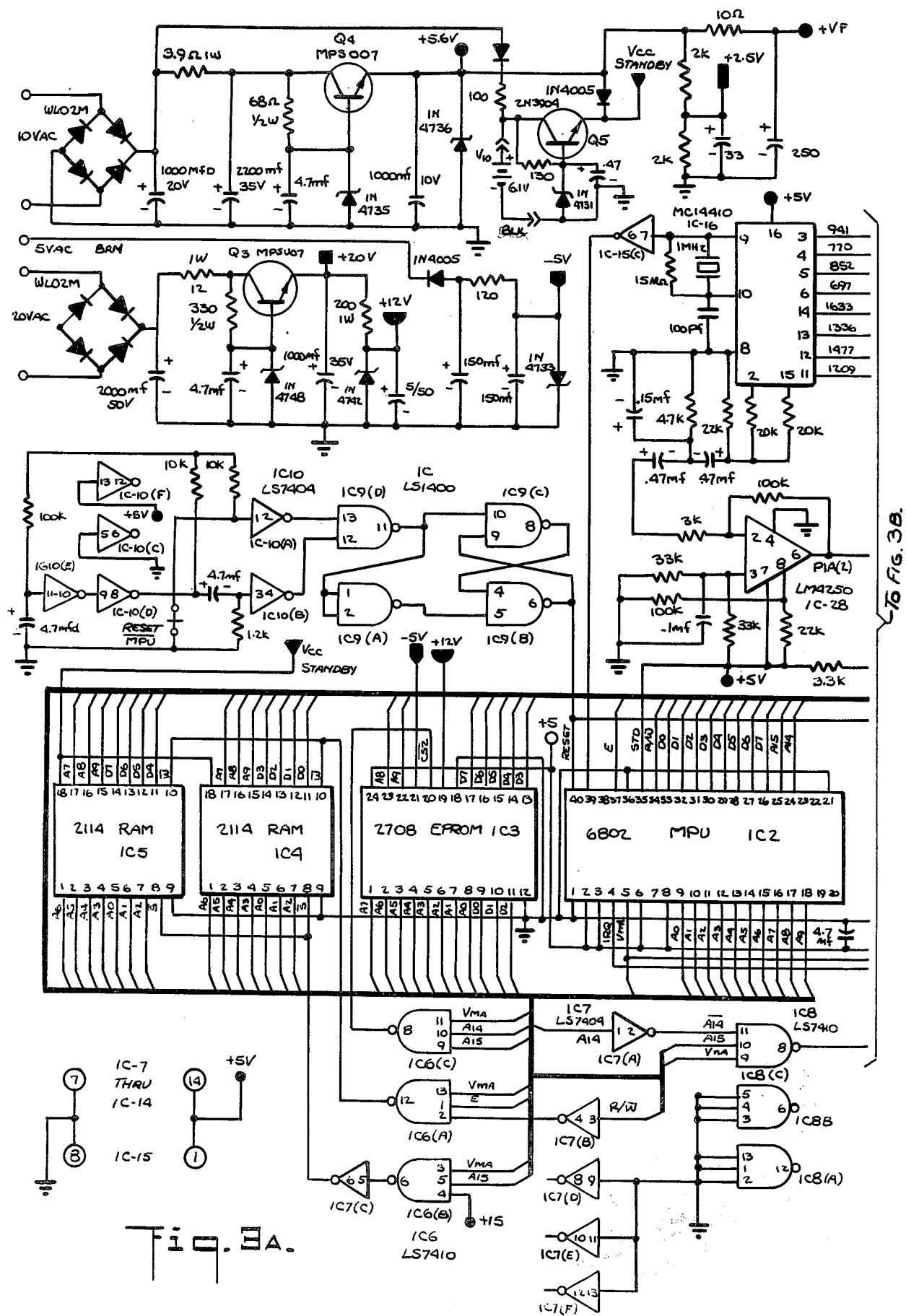

The micro-processor M/P is shown in FIGS. 3A and 3B and consists of Integrated Circuits I.C.1 to I.C.10 with a number of support Integrated circuits. A Motorola 6800 type M/P may be used which is programmed with a particular proprietary program. Power supplies include transistors Q3, Q4, and Q5 which provide power through regulation and filtering of 3 AC sources identified as 10 VAC, 20 VAC and 5 VAC. These supply +5.6 VDS; −5 VDC; +VF 12 VDC and Vcc standby. Vcc standby is used to provide power to an external standby battery pack for memory retention during local power outages.

I.C.11, I.C.12, and I.C.15 comprise a plurality of logic gates which interpret the M/P output from 4 bit language to 2 of 8 bit code for I.C.16 which then converts this input into telephone dialing tones. I.C.16 is provided with a 1 MHz oscillator which also provides a clock pulse to the M/P through I.C.15(C). Output tones on pins 2 and 15 of I.C.16 pass through a low pass filter system to pin 2 of Amplifier I.C.28. Amplifier I.C.28 restores the amplitude of the tones to proper level for use in the telephone system and goes out to socket PIA (2).

Figure 4A:
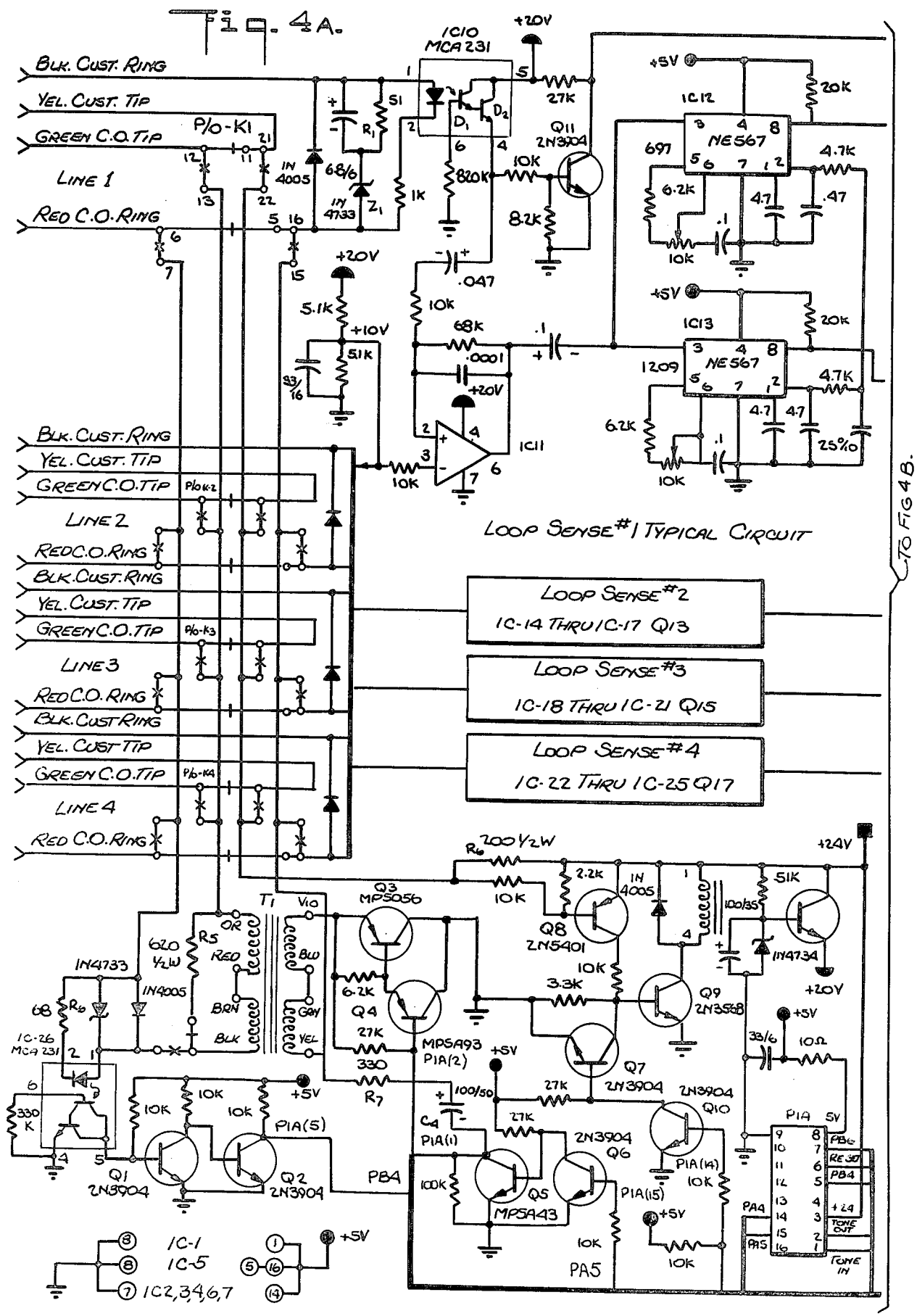
FIGS. 4A and 4B is a schematic view of the interface module used with the present invention.
Figure 4B:
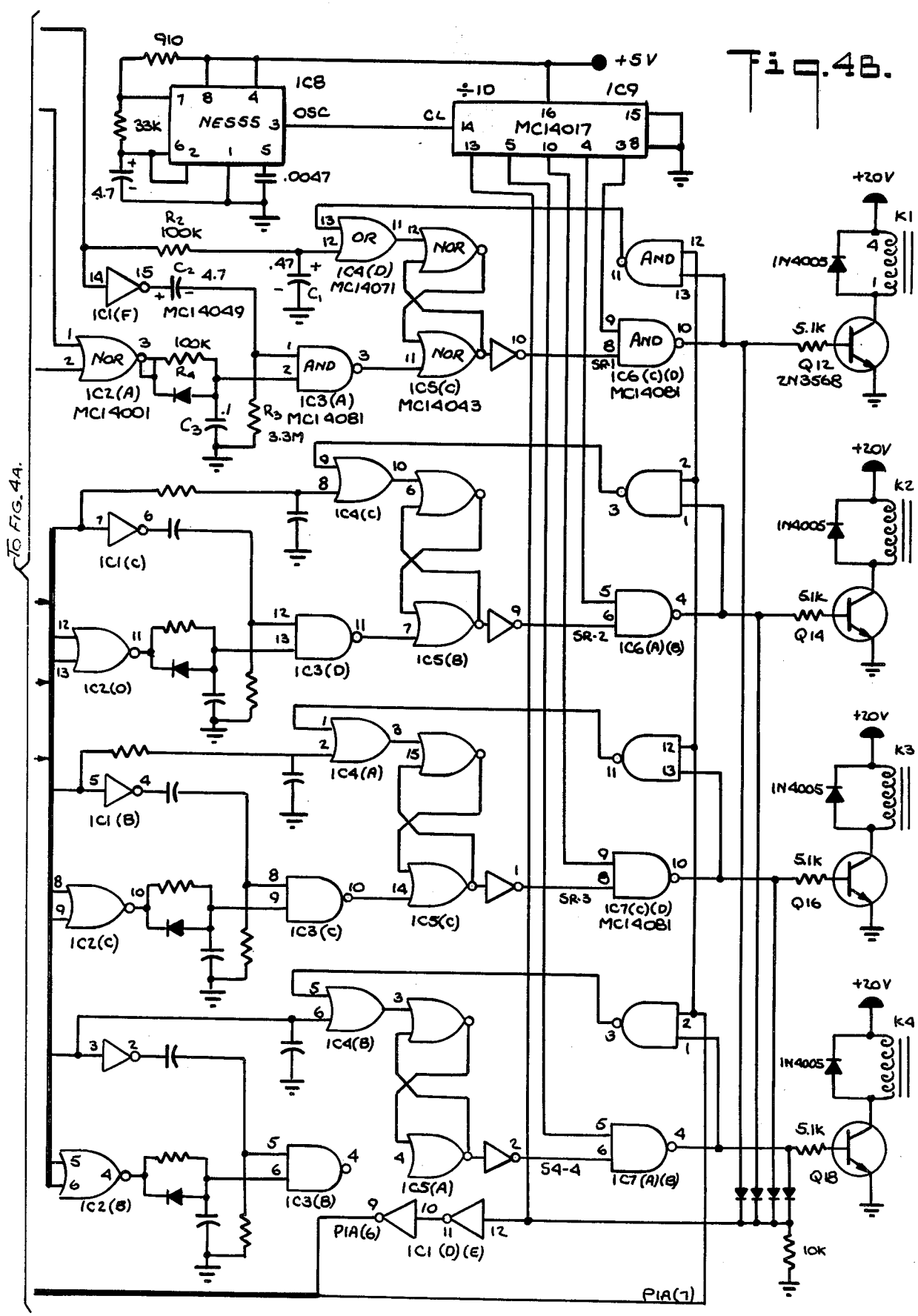

Addressing tones from any telephone, as hereinafter more fully discussed in connection with the Interface module shown in FIGS. 4A-4B, are placed on socket PIA (1) and go to A.G.C. circuit I.C.26 and I.C.27 and transistors Q1 and Q2. The A.G.C. circuit provides constant tone level to the tone detector circuits I.C.17 to I.C.23. Each tone detector circuit I.C.17 to I.C.23 is identical and uses a phase lock loop (P.L.L.). Each tone detector circuit I.C.17 to I.C.23 is adjusted to pick-up a separate tone and produce a 2 of 7 code output on pin 8 of each tone detector circuit. Each pin 8 feeds decoder circuit I.C.24 which decodes the 2 of 7 bid code into 4 bid language for the M/P. In summary, the microprocessor module M/P receives and generates tones from any telephone system, with some interfacing.

Additional inputs and outputs to the M/P are also on the PIA socket for control reasons. The PIA socket is connected to the Interface Module through plugs and stip wiring to PIA socket. The Interface Module buffers the M/P to the outside world and since it handles 4 telephone lines, there are 4 similar circuits and one common circuit. Each of the 4 similar circuits comprises Tip and Ring signals come from the central office (C.O.) telephone lines and are marked Green (C.O.) and Red (C.O.). These leads enter the Interface Module to P10-K1 and return to the customer through Tip and Ring (Cust.) which may be marked black and yellow (Cust.). The ring side of both lines pass through pins 1 and 2 of I.C.10 which is an opto-isolator having a darlington pair D1-D2 which turn on when current is flowing in the L.E.D. across pins 1 and 2. The zener diode Z1 and the Resistor R1 (51 ohm) regulates the voltage across pins 1 and 2. Q11 turns on (Low) when 12 MA or more flows through the ring side of K1. This low transition is felt on I.C.4(d) through a 100K OHM resistor R2 and a 0.47 MFD Capacitor C1 on pin 12 of I.C.4(D).

At this time, Q12 is off, keeping K1 unlatched which results in logic 0 on pin 13 of I.C.6(C)-(D). This results in pin 11 of the same I.C.6(C)-(D) to go to logic 1. Pin 11's high goes to pin 13 of I.C.4(d), and it's output from pin 11 stays high and cannot move. These two paths will reset pin 12 of I.C.5(c). Q11 feeds pin 14 of inverter I.C.1(F) whose output on pin 15 feeds an R-C network of capacitor C2 (4.7) and resistor 13 (3.3M) to pin 1 of I.C.3(A). This R-C network keeps a high on pin 1 of I.C.3(A) for a 5 Sec. interval, thus keeping the I.C.3(a) gate open for that time. During this 5 Sec. time, if tones representing [*] are dialed by a phone on the cust. tip and ring, opto-isolator I.C.10 couples this tone to its emitter pin 4. The tone is then amplified by amplifier I.C.11 and goes out pin 6 from its input on pin 2. Pin 6 goes to pins 3 on both I.C.12 and I.C.13. I.C.12 and I.C.13 are phase-locked loop tone detectors which are adjusted to sense the [*] tones. The outputs of I.C.12 and I.C.13 on pin 8 are put into coincidence in I.C.2(a) at pins 1 and 2. When both are logic low, pin 3 of I.C.-2(A) goes to logic high.

Pin 3 of I.C.2(a) charges a capacitor C3 (0.1 MF) through a resistor R4 (100 K) and puts a logic 1 on pin 2 of I.C.3(a). When both pins 1 and 2 on I.C.3(A) are high, then pin 3 goes low. This feeds pin 11 of I.C.5(c). Oscillator I.C.8 operates at a nominal rate and feeds a clock pulse to counter I.C.9 at pin 14. Counter I.C.9 is a one of ten counters and runs from the clock pulse. Every other output or 4 outputs from pins 3, 4, 10 and 5 of counter I.C.9 feeds the four identical line circuits. This feed is to pins 5 and 9 of I.C.6(A)-(C) and pins 5 and 9 of I.C.7(A)-(C).

Gate I.C.5(C) is a bi-stable flip-flop gate in which pin 11 can set and pin 12 can reset its output on pin 10. It is normally reset and pin 10 is normally low. When pin 11 goes low, pin 10 sets to a high. When pin 8 on I.C.6(C) goes high from pin 10 of I.C.5, it opens gate I.C.6(C) and allows an input from pin 3 of I.C.9 (pin 9) to its output on pin 10 I.C.9. This high turns Q12 on and latches K1. In addition, pin 10 of I.C.6 goes to pin 12 of I.C.1 through a diode "OR" circuit. Pin 12 also goes to pin 13 of I.C.9 and enables lead and stops I.C.9 from clocking to its next count. Pin 9 of I.C.6(C) is now held high and relay K1 stays latched. This sequence is similar for K2-K3 and K4 and shows how the [*] and loop current on cust. ring will access the MDS.

Removing the latched K1 or any of the 4 line relays occurs when the loop current on cust. ring is released (Hanging Up) or through normal M/P operation. Hanging up allows I.C.10 to turn off, which turns Q11 off, which puts the reset line to pin 12 of I.C.4(D) high. This resets I.C.5(C) so as to turn relay K1 off. Normal operation after line access [*] is so that only one of the four relays (K1 to K4) can latch at a given time. If more than one access on different lines occur, I.C.5 may have set on pins 10, 9, 1 or 2. In this case, when the M/P is finished, a pulse is sent from the M/P pin 7 of socket PIA. This is a release pulse and is bused to I.C.6 and I.C.7(B)-(D). Only the respective line presently active will reset through I.C.'s 6 or 7 (B&P) to output to I.C.4(D). When this happens I.C.5 will reset and release its relay (K1 to K4). This, in turn, releases the enable lead to pin 13 of the clock I.C.9 which allows I.C.9 to continue clocking to the next line for its service. This action provides "Stacking".

After a relay line (K1 to K4) is latched, the system is considered "Accessed". After access, one of the relays that is latched, is fed to a transformer T1 circuit. Several things occur at this time. C.O. Tip and Ring are opened and incoming line is placed "On Hook". At the same time, a resistor R5 (620 OHM) is placed across orange and black leads of T1 to act as a load to dialed tones as will be discussed hereinafter. In addition, a series circuit of Opto-Isolator I.C.26 (IN4733) and a resistor R6 (68 OHM) is connected. Furthermore, Cust. tip and ring are connected to the T1 circuitry. Customer Ring is placed on T1—Yellow and Customer Tip is placed to +24 Volts through resistor R6 (200 OHM). The Violet lead of T1 goes to Darlington pair Q3 and Q4. Q3 and Q4 are an emitter follower group and are controlled directly from the M/P board through PIA socket pin 2. Q3 and Q4 places tones from the micro-processor M/P to the telephone lines through T1 when called to do so. I.C.26 drives Q1 and Q2 to PIA socket pin 5. This circuit tells the M/P when the dial tone arrives, by sensing the momentary opening in the C.O. tip and ring just before dial tone appears. It should be noted that any line can be attached to T1 circuits, through the lines respective loop and [*] circuit just by latching its own relay (K1 to K4). Current is fed to customer tip and ring, via T1 circuitry, so as the customer telephone is isolated from C.O. tip and ring and can still dial.

The next sequence of events is the customer dials two digits representing a memory position (00 to 99). These tones are picked up on the yellow lead of T1 and fed to a resistor R7 (330 OHM) and capacitor C4 (100 Mf) to PIA socket pin 1. The M/P tone decoder then feeds the M/P with information. The M/P then signals the Interface module to do several things. First, a signal from the M/P via PIA socket pin 4 goes through Q10 and turns Q7 off. This allows Q9 to turn on from Q8, which is sensing customer loop current. When Q9 turns on, relay K5 emergizes. With K5 on the resistor R5 on T1 orange and black is removed from the C.O. line (Ring Side) is attached to T1 black. The C.O. loop current is then established and moments later an open circuit (caused by the C.O.) precedes the dial tone. At this time, Q1 and Q2 of I.C.26 pass a pulse to the M/P and begins the dialing sequence. In the dialing sequence, Q5 and Q6 turn on, providing an AC short to yellow lead of T1. This prevents new signals from the telephone from distracting the M/P or C.O. tone receiver circuits. It also allows proper driving of T1 by Q3 and Q4 tone sender transistors. After approximately ½ second after dial tone appears, the M/P sends signals to tone generator on the M/P and to socket PIA pin 2. This, in turn, drives Q3 and Q4 sending tone to the C.O. After the last tone is sent, a release signal is sent to PIA socket pin 7 to release the line circuit. The appropriate line relay releases and the unit goes to the next in "STACK" or waits until accessed again.

Programming is done by a method similar to the one described above, except that the M/P is programmed to behave slightly different. Its access is the same way ([*]), but after this digit, a [#] is depressed so as a different routine can occur. The instruction program will respond to all digits on standard 12 button keyboard pads and [*]. [#] are control buttons. After [#] is depressed, dialtone immediately appears and the M/P will now accept numbers from the phone. It stores these digits temporarily and after the last digit, the call will go through. Before or after the call going through, the user can option to store his digits in a given memory position. The user then presses [#] and then [*]. This removes the C.O. lines by releasing K5, putting the M/P into its next cycle. The user then depresses 2 digits (00 to 99) representing where the storage place will be. He then releases the system by going on hook.

The M/P program is set up with provision to dial out in rotary dial pulses or in tone dial should the user need this provision. Such feature may be required if one line were attached to a rotary dial intercom and the user had tone dial phones to access the C.O. When PIA socket pin 16 is grounded, the M/P will then dial out in rotary.

In case of power failure, the MDS is by-passed so that normal service can occur. Support modules may consist of a power supply pack and a battery pack. The power supply module contains 2 transformers and line cord for local power. It has wires which go to the Interface Module. The battery pack consists of 4 each, 6VDC rechargeable batteries in the parallel. This supply is charged during normal operation and only supplies power to the memory I.C.'s in the M/P. It provides about 8 hours of life to retain the 100 numbers.

It will thus be seen that the present invention provides for an improved memory dialer system which can service all extensions from a single control unit, which can service up to four trunks and which, when more than two calls are dialed, one is held on hold until the line is clear.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A memory dialer system for a telephone system having a telephone line and a plurality of telephone extensions comprising microprocessing means, interface means, means for connecting the interface means with said microprocessing means and with at least one of said telephone lines, memory means in said microprocessing means for storing a predetermined number of telephone numbers, means responsive to selection means for activating the processing means to automatically dial a selected telephone number, said selection means being operable by means operatively connected to each of said telephone extensions, and means operable from each of said telephone extensions to program said memory to store additional telephone numbers for future use, said interface being connected to each extension, and means provided to delay a call unit until a line is cleared if more than two telephone numbers are simultaneously dialed.

2. A memory dialer system as claimed in claim 1, wherein means are provided for the processing means to wait for a dial tone before dialing.

3. A memory dialer system as claimed in claim 1, wherein means are provided for the processing means to stack users on multiple access.

4. A memory dialer system as claimed in claim 3, wherein means are provided to emit a fast busy signal when stacking occurs.

5. A memory dialer system as claimed in claim 4, wherein means are provided for stacking when a plurality of numbers are selected.

6. A memory dialer system as claimed in claim 5, wherein means are provided to stop the busy signal when there is unstacking.

7. A memory dialer system as claimed in claim 6, wherein means are provided so that hanging-up removes the user from the stack.

8. A memory dialer system as claimed in claim 1, wherein means are provided to prevent failure of commercial power supply from inhibiting ordinary use of the telephone.

9. A memory dialer system as claimed in claim 8, wherein means are provided to prevent erasure of memory upon failure of the power supply.

10. A memory dialer system as claimed in claim 9, wherein battery means are provided to supply power if there is a power failure.

11. A memory dialer system as claimed in claim 1, wherein said micro-processing means comprises a plurality of integrated circuits having a plurality of power transistors providing power through a plurality of AC sources.

12. A memory dialer system as claimed in claim 11, wherein some of said integrated circuits comprise logic gates which interpret the output from 4 bit to 2 of 8 bit code for a converter circuit converts the output into telephone dialing tones.

13. A memory dialer system as claimed in claim 12, wherein said converter circuit comprises an oscillator which provides for a clock pulse from another integrated circuit.

14. A memory dialer system as claimed in claim 13, wherein output tones on said converter pass through the filter system of an amplifier which restores the amplitude of the tones to proper levels for telephone use.

15. A memory dialer system as claimed in claim 14, wherein the interface means is connected to the processing means and the tones from the processing means are directed to A.G.C. circuits in the interface means which include a pair of transistors.

16. A memory dialer system as claimed in claim 15, wherein said A.G.C. circuit provides constant tone level to a plurality of tone detector circuits, each of which is adapted to receive a separate tone and produce a 2 bit code.

17. A memory dialer system as claimed in claim 16, wherein each tone detector circuit feeds a decoder circuit which decodes the 2 bit code into 4 bit codes.

18. A memory dialer system as claimed in claim 17, wherein each of the telephone circuits comprise tip and ring circuitry, the ring side of which pass through an opto-isolator having a darlington pair which will turn on when current is flowing.

19. A memory dialer system as claimed in claim 18, wherein regulation means are provided to regulate the voltage and wherein a transistor turns on when a certain amount of current flows through the ring side.

20. A memory dialer system as claimed in claim 19, wherein another transistor is provided which turns off when the first transistor turns on resulting in a logic 0 on a pin of an integrated circuit and a logic 1 on a second pin of said integrated circuit.

21. A memory dialer system as claimed in claim 20, wherein the first transistor causes an input to an inverter circuit which feeds an R-C network keeping a second integrated circuit high with its gate open for a predetermined time interval causing the opto-isolator to couple a tone to an amplifier which then is directed to the phase locked loop tone detectors.

22. A memory dialer system as claimed in claim 21, wherein the outputs of both tone detectors are placed into coincidence in another integrated circuit and when both are of low logic, a second integrated circuit goes to a high logic to charge a capacitor which puts a high logic on the second integrated circuit.

23. A memory dialer system as claimed in claim 22, wherein when certain portions of the integrated circuit goes high, the output is low and is directed to another integrated circuit which, in turn, operates an oscillator which feeds a clock pulse to a counter.

24. A memory dialer system as claimed in claim 23, wherein there are a plurality of counters with every other output feeding four line circuits of two integrated circuits.

25. A memory dialer system as claimed in claim 24, wherein a gate of the integrated circuit is a bi-stable flip-flop gate, a pin of which is normally reset and another pin of which is normally low so that when one pin goes low, the other pin goes high to open a gate to turn on the second transistor and latch the line by a relay.

26. A memory dialer system as claimed in claim 25, wherein unlatching occurs by hanging-up the receiver which allows an integrated circuit to turn off the first transistor to turn off said relay.

27. A memory dialer system as claimed in claim 26, wherein when access to a different line is requested, a release pulse is emitted from the micro-processor to the integrated circuits and to the active line which will reset and initiate means for resetting the relay which releases the clock to allow the clock to continue signalling.

28. A memory dialer system as claimed in claim 27, wherein a darlington pair of an emitter follower group place tones from the micro-processor means to the telephone lines through a transformer circuit.

29. A memory dialer system as claimed in claim 28, wherein an integrated circuit drives a pair of transistors which senses the opening of the tip and ring lines so that the micro-processor is made aware of dial tone arrival.

30. A memory dialer system as claimed in claim 29, wherein memory position tones are provided to turn off a transistor which senses the customer loop current and energizes a relay circuit in which the telephone lines are removed from the incoming lines and placed on the transformer so that an open circuit precedes the dial tone.

* * * * *